US011852726B2

(12) United States Patent
Tian et al.

(10) Patent No.: US 11,852,726 B2
(45) Date of Patent: Dec. 26, 2023

(54) IMAGE PROCESSING-BASED LASER EMISSION AND DYNAMIC CALIBRATION APPARATUS AND METHOD, DEVICE AND MEDIUM

(71) Applicant: Anyang Yidu Network Technology Company, Henan (CN)

(72) Inventors: Guoxun Tian, Henan (CN); Wei Wang, Henan (CN); Yang Zhang, Henan (CN); Guoquan Chang, Henan (CN); Zhaoxia Wu, Henan (CN)

(73) Assignee: Anyang Yidu Network Technology Company, Henan (CN)

(*) Notice: Subject to any disclaimer, the term of this patent is extended or adjusted under 35 U.S.C. 154(b) by 409 days.

(21) Appl. No.: 17/330,414

(22) Filed: May 26, 2021

(65) Prior Publication Data
US 2022/0253057 A1 Aug. 11, 2022

(30) Foreign Application Priority Data
Feb. 5, 2021 (CN) .......................... 202110170141.8

(51) Int. Cl.
*G01S 17/88* (2006.01)
*G01S 7/497* (2006.01)

(52) U.S. Cl.
CPC .............. *G01S 17/88* (2013.01); *G01S 7/497* (2013.01)

(58) Field of Classification Search
CPC .................. G01S 17/88; G01S 7/497; G06T 2207/10032; G06T 2207/10152; G06T 2207/30188; G06T 7/73; H02G 1/02; A01M 1/226; G08C 17/02

USPC ............................................................. 356/3
See application file for complete search history.

(56) References Cited

FOREIGN PATENT DOCUMENTS

| CN | 105242392 | 1/2016 |
| CN | 205646620 | 10/2016 |
| CN | 110419315 | 11/2019 |
| CN | 110490834 | 11/2019 |
| JP | 2009271274 | 11/2009 |

OTHER PUBLICATIONS

Zhou Weiwei, et al., "Research on laser foreign body remover device", Computer Measurement & Control, Jan. 5, 2018, pp. 123-127.

*Primary Examiner* — Md M Rahman
(74) *Attorney, Agent, or Firm* — JCIP GLOBAL INC.

(57) ABSTRACT

The present invention discloses an image processing-based laser emission and dynamic calibration apparatus and method, a device and a medium. The apparatus includes: an image acquisition system configured to acquire images of a target and a laser spot; an image processing system connected to the image acquisition system and configured to extract the target's attribute and coordinate information, and coordinate information of the laser spot; a control system connected to the image processing system and configured to sight or calibrate a laser emission angle based on a result of the image processing system, and send an instruction to a laser emission system; and the laser emission system bound to the image acquisition system and connected to the control system, and configured to calibrate the laser emission angle based on the instruction of the control system or emit laser. The present invention completes automatic adjustment of a laser emission angle.

20 Claims, 4 Drawing Sheets

IMAGE PROCESSING-BASED LASER EMISSION AND DYNAMIC CALIBRATION APPARATUS AND METHOD, DEVICE AND MEDIUM

CROSS-REFERENCE TO RELATED APPLICATION

This application claims the priority benefit of China application serial no. 202110170141.8, filed on Feb. 5, 2021. The entirety of the above-mentioned patent application is hereby incorporated by reference herein and made a part of this specification.

BACKGROUND

Technical Field

The present invention relates to the technical field of foreign body removal, and in particular, to an image processing-based laser emission and dynamic calibration apparatus and method, a device and a medium.

Related Art

With the development of automation, more and more devices seek automatic control. The foreign body removal using laser is used in such aspects as power transmission lines or agricultural disinsection and weeding. The environment along overhead transmission lines is complicated, and floating foreign bodies such as kites and kite lines, agricultural plastic cloth, advertising cloth, and sunshade nets are often entangled on the power transmission lines, causing line trip and outage or line damage, which causes great economic losses to the power system and society. Smart agriculture is an industrial policy strongly advocated by the state currently. How to reduce or eliminate the use of pesticides is the goal of organic agriculture development. As the global environment is getting worse, the use of pesticides has also exacerbated this situation. Therefore, the use of laser technology has become an important technical means to resolve the problems above.

The conventional laser sighting obstacle remover is not easy to aim during use, especially when foreign bodies are in motion with the wind or affected by other factors, the manual sighting method is inaccurate and inefficient.

SUMMARY

Objectives of the invention: For the defects in the prior art, the present invention discloses an image processing-based laser emission and dynamic calibration apparatus and method, a device and a medium, to complete automatic adjustment of a laser emission angle by dividing a to-be-adjusted angle of laser emission into two angles in transverse and longitudinal directions, thereby realizing automatic sighting and emission of laser.

Technical solutions: To achieve the foregoing objectives, the present invention adopts the following technical solutions.

An image processing-based laser emission and dynamic calibration method, including the following steps:

S1: initialization: setting an initial angle of laser emission and a photographing angle of a fixed camera to be vertically downward, i.e., perpendicular to a target plane, and configuring a laser emission system to obtain an image through an image acquisition system synchronously each time laser is emitted, the image including a light spot of the laser;

S2: acquisition of a target image: controlling an angle of image acquisition in the image acquisition system to be perpendicular to the target plane, and acquiring, by the image acquisition system and the laser emission system, an original image in the process of movement, and transmitting same to an image processing system in real time;

S3: laser sighting: extracting, by the image processing system, pixel coordinates of a target in the original image and sending same to a control system, and calculating, by the control system, pixel coordinates of a vertical projection point of a laser emitter on the image, a transverse scanning distance coefficient and a longitudinal scanning distance coefficient;

S4: laser emission: calculating, by the control system, a transverse scanning angle and a longitudinal scanning angle of laser emission based on the transverse scanning distance coefficient, the longitudinal scanning distance coefficient and the pixel coordinates of the target, and controlling, by the control system, the laser emission system to adjust the transverse scanning angle and the longitudinal scanning angle of laser emission to emit laser;

S5: confirmation of whether the target is hit: acquiring, by the image acquisition system, an image of laser emission and sending same to the image processing system to determine whether pixel coordinates of the laser spot in the image are consistent with the pixel coordinates of the target; if yes, confirming that the target is hit and returning to the step S2 to acquire a new target image; and if not, proceeding to the step S6; and S6: if the target is not hit, dynamically correcting a laser emission parameter based on a current laser emission angle and the image of the laser spot acquired by the image acquisition system; using a new transverse scanning distance coefficient, a new longitudinal scanning distance coefficient, projection coordinates of the laser emitter, and a corrected initial emission angle after the correction; and returning to the step S2 to reacquire a target image.

Preferably, a specific process of calculating pixel coordinates of a vertical projection point of a laser emitter on the image, a transverse scanning distance coefficient and a longitudinal scanning distance coefficient in the step S3 includes:

S31: establishing a coordinate system: the pixel coordinates of the vertical projection points of the laser emitter and the image acquisition system on the image being $(x_s, y_s)$ and $(x_0, y_0)$ respectively, where $(x_0, y_0)$ is always an image center; and reestablishing a rectangular coordinate system on the image;

S32: controlling, by the control system, the laser emitter to emit laser at any two angles $a_1$ and $a_2$, and dividing the two angles $a_1$ and $a_2$ into a transverse scanning angle and a longitudinal scanning angle according to the rectangular coordinate system in the step S31, i.e., $(a_{L1}, a_{v1})$ and $(a_{L2}, a_{v2})$; and S33: obtaining pixel coordinates $(x_{L1}, y_{v1})$ and $(x_{L2}, y_{v2})$ of the laser spot after the laser is emitted by the laser emitter at any two angles $a_1$ and $a_2$, and calculating the pixel coordinates of the vertical projection point of the laser emitter on the image, the transverse scanning distance coefficient and the longitudinal scanning distance coefficient according to a trigonometric function.

Preferably, formulas for calculating the pixel coordinates of the vertical projection point of the laser emitter on the image, the transverse scanning distance coefficient and the longitudinal scanning distance coefficient according to the trigonometric function are:

$$d * cL = \frac{(x_{L1} - x_s)}{\tan(a_{L1})}$$

$$d * cL = \frac{(x_{L2} - x_s)}{\tan(a_{L2})}$$

$$d * cV = \frac{(y_{V1} - y_s)}{\tan(a_{V1})}$$

$$d * cV = \frac{(y_{V2} - y_s)}{\tan(a_{V2})}$$

where cL is the transverse scanning distance coefficient, cV is the longitudinal scanning distance coefficient, and d is a vertical distance between the laser emitter and the target plane.

Preferably, the dynamically correcting, and calculating the updated transverse scanning distance coefficient, the updated longitudinal scanning distance coefficient, the projection coordinates of the laser emitter, and the corrected initial emission angle in the step S6 includes: controlling, by the control system, the laser emitter to adjust the angle multiple times and emit laser; and after obtaining the pixel coordinates of the laser spot on the image respectively, recalculating and updating the transverse scanning distance coefficient, the longitudinal scanning distance coefficient, the projection coordinates of the laser emitter and the corrected initial emission angle according to the trigonometric function.

Preferably, calculation formulas for calculating the transverse scanning angle and the longitudinal scanning angle of laser emission in the step S4 are:

$$\tan(a_{TL}) = \frac{(x_T - x_s)}{d * cL}$$

$$\tan(a_{TV}) = \frac{(y_T - y_s)}{d * cV}$$

where $a_{TL}$ is the transverse scanning angle of laser emission, $a_{TV}$ is the longitudinal scanning angle of laser emission, cL is the transverse scanning distance coefficient, cV is the longitudinal scanning distance coefficient, d is the vertical distance between the laser emission system and the target plane, $(x_T, y_T)$ is the pixel coordinates of the target, and $(x_s, y_s)$ is the pixel coordinates of the vertical projection point of the laser emitter on the image.

An image processing-based laser emission and dynamic calibration apparatus, for implementing the image processing-based laser emission and dynamic calibration method according to any one of the above aspects, including an image acquisition system, an image processing system, a laser emission system and a control system;

the image acquisition system being configured to acquire images of a target and a laser spot;

the image processing system being connected to the image acquisition system, and being configured to extract the target's attribute and coordinate information, as well as coordinate and size information of the laser spot;

the control system being connected to the image processing system, and being configured to sight or calibrate a laser emission angle according to a result of the image processing system, and send an instruction to the laser emission system; and the laser emission system being bound to the image acquisition system with a relative distance unchanged, being connected to the control system, and being configured to calibrate the laser emission angle based on the instruction of the control system or emit laser.

Preferably, the laser emission system includes a laser emitter and a laser steering apparatus; the laser emitter is installed on the laser steering apparatus; the laser steering apparatus is connected to the control system, and is configured to calibrate the laser emission angle based on the instruction of the control system; calibration of the laser emission angle includes angle calibrations in the transverse and longitudinal directions; and the laser emitter is connected to the control system, and is configured to emit laser after receiving the instruction of the control system.

Preferably, the laser steering apparatus includes two motors, and the two motors respectively control the angle of laser emission from the transverse and longitudinal directions.

An electronic device, including a memory, a processor, and a computer program stored in the memory and executable by the processor, where the image processing-based laser emission and dynamic calibration method according to any one of the above aspects is implemented when the processor executes the program.

A computer readable storage medium, having computer executable instructions stored thereon, where the computer executable instructions are configured to execute the image processing-based laser emission and dynamic calibration method according to any one of the above aspects.

Advantageous effects: The present invention completes automatic adjustment of a laser emission angle by dividing a to-be-adjusted angle of laser emission into two angles in the transverse and longitudinal directions, thereby realizing automatic sighting and emission of laser.

DETAILED DESCRIPTION

The following further describes and explains an image processing-based laser emission and dynamic calibration apparatus and method, a device and a medium of the present invention with reference to the accompanying drawings and embodiments.

Figure 1:
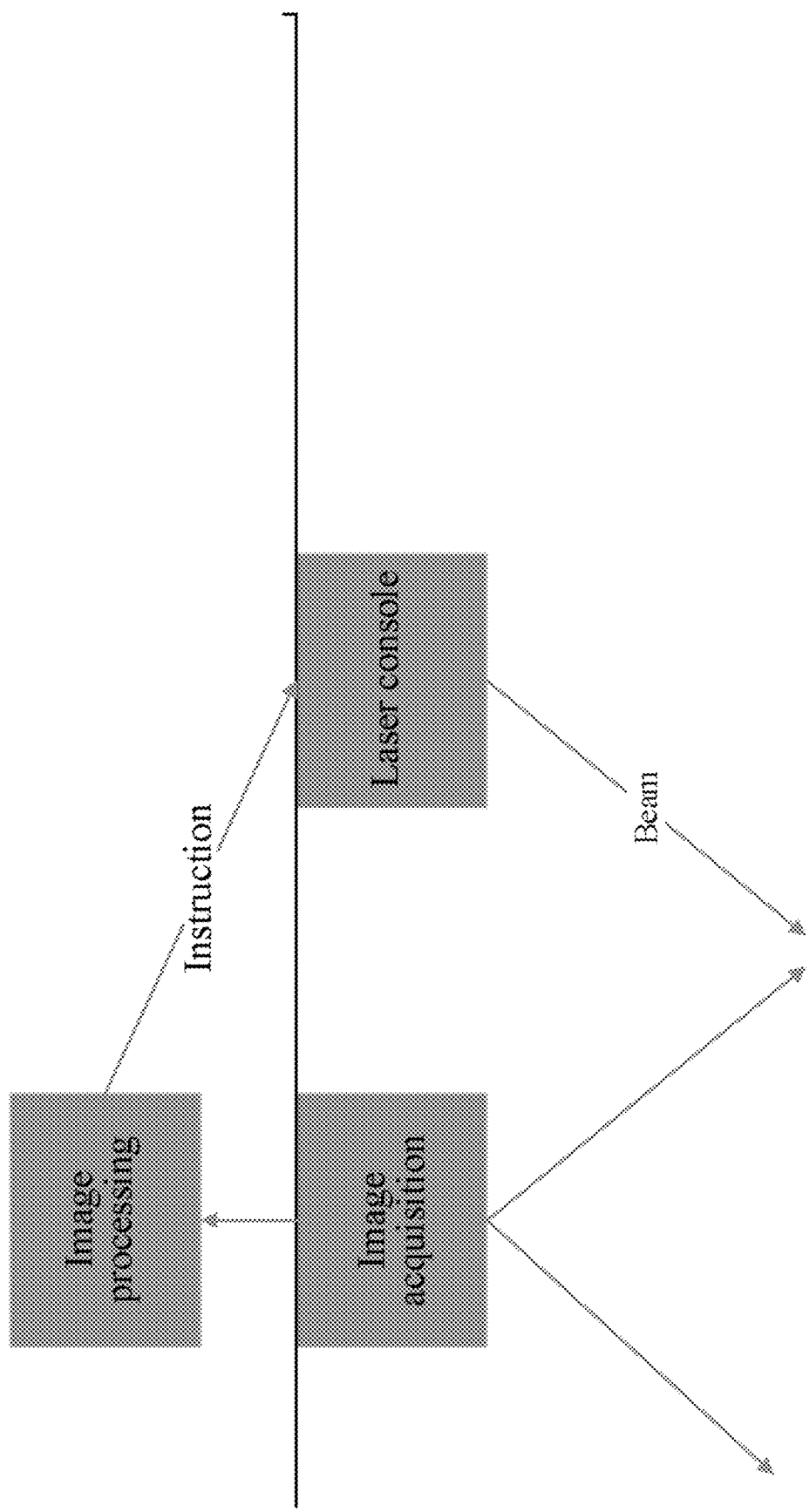
FIG. 1 is a schematic structural diagram of the present invention.

As shown in FIG. 1, an image processing-based laser emission and dynamic calibration apparatus includes an image acquisition system, an image processing system, a laser emission system and a control system.

The image acquisition system is configured to acquire images of a target and a laser spot. The image acquisition system in the present invention may be a monocular camera system or a binocular camera system. In the state of the binocular camera system, for targets on planes with different vertical distances, two cameras may be used for capturing two images, and three-dimensional coordinates of the target are synthesized using a coordinate difference of the target on the two images and the distance between the two cameras, thereby calculating an angle of laser emission.

The image processing system is connected to the image acquisition system, and is configured to extract the target's attribute and coordinate information, as well as coordinate information and size information of the laser spot. In some embodiments, the image processing system may be a minicomputer, for example, with the configuration of i7 tenth-generation cpu having 6 cores, 12 threads, 32G memory, and 1T SSD, and an image processing method may be recognizing images using a neural network algorithm, and may also be capturing dynamic targets using a dynamic background difference method and a three-frame difference method. The dynamic background difference method and the three-frame difference method are common algorithms for motion detection.

In the process of spot recognition, the image processing system extracts the coordinate information and size information of the laser spot. Specifically, the size information of the spot is first obtained, that is, area coordinates of the spot are detected, and then center coordinates of the spot area are extracted as the detected coordinate information of the laser spot. In addition, when the area coordinates of the spot are detected, the method further includes determining whether the size of the spot exceeds a threshold, that is, when the range of the spot is too large or too small, the image processing system sends to the control system a conclusion that the laser is to be focused, and the control system then sends a laser focusing instruction to the laser emission system to adjust the size of the laser spot.

The control system is connected to the image processing system, and is configured to sight or calibrate a laser emission angle according to a result of the image processing system, and send an instruction to the laser emission system.

In some embodiments, the control system may be a remote-control system, which transmits information to the image processing system through wireless communication, such as a WIFI mode and a Bluetooth mode. However, in some scenarios, the coverage of a local area network is not guaranteed, and the real-time stability of the local area network cannot be guaranteed. In this case, the control system may also be an embedded control system, which performs processing through a CPU, that is, in some other embodiments, the image acquisition system, the image processing system, the laser emission system and the control system are bound together, and are placed on an unmanned aerial vehicle, thereby reducing the impact on the accuracy and timeliness of laser emission due to a signal delay caused by long-distance signal transmission.

The laser emission system is bound to the image acquisition system with a relative distance unchanged, is connected to the control system, and is configured to calibrate the laser emission angle based on the instruction of the control system or emit laser.

The laser emission system includes a laser emitter and a laser steering apparatus; the laser emitter is installed on the laser steering apparatus. The laser steering apparatus is connected to the control system, and is configured to calibrate the laser emission angle based on the instruction of the control system. Calibration of the laser emission angle includes angle calibrations in the transverse and longitudinal directions. The laser emitter is connected to the control system, and is configured to emit laser after receiving the instruction of the control system.

The laser steering apparatus includes two motors, and the two motors respectively control the angle of laser emission from the transverse and longitudinal directions.

Figure 5:
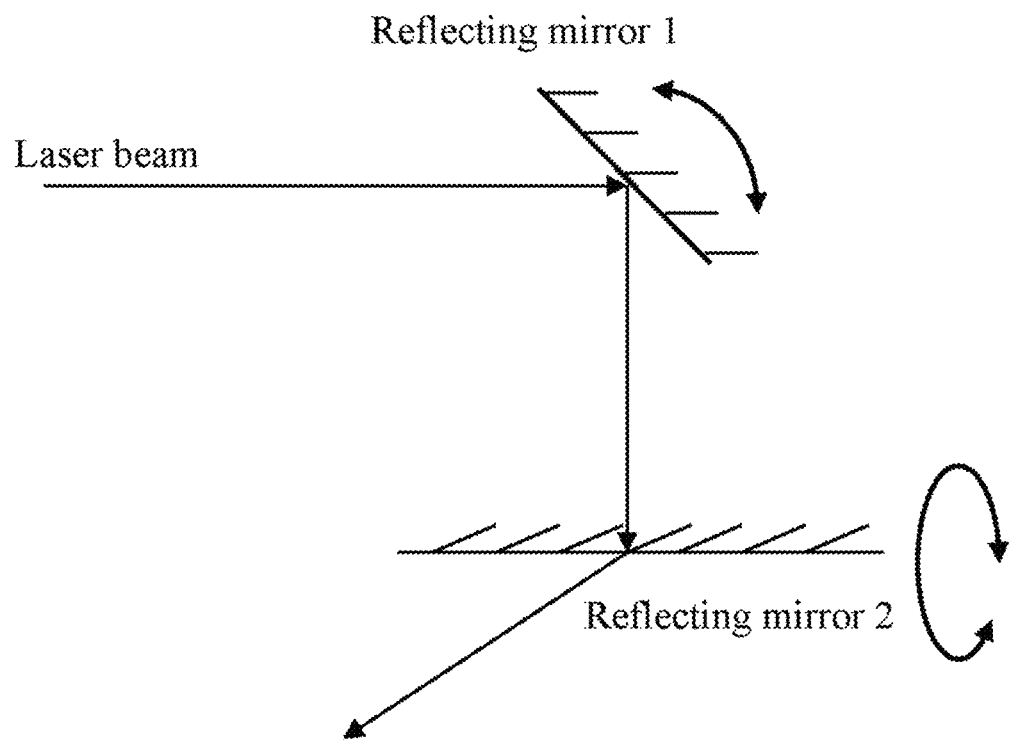
FIG. 5 is a schematic structural diagram of a laser emission system according to an embodiment.

The laser steering apparatus may have the following three applications: (1) The laser emitter is installed on a platform, and the platform is controlled by two motors and may be rotated in the transverse and longitudinal directions, that is, the laser emitter is directly controlled by the two motors, to adjust the angle of emission. (2) In order to improve a response speed, the laser emitter may also be fixed, and a reflecting mirror is placed in front of the laser emitter. The mirror is controlled by two motors to rotate in the transverse and longitudinal directions. It is possible to install one reflecting mirror, controlled by two motors, or to install two reflecting mirrors, each controlled by one motor. As shown in FIG. 5, FIG. 5 shows two reflecting mirrors, each of which is controlled and steered by a motor to control the transverse scanning angle and the longitudinal scanning angle of the laser. (3) A Steerable Electro-Evanescent Optical Refractor (SEEOR) may also be used.

Figure 2:
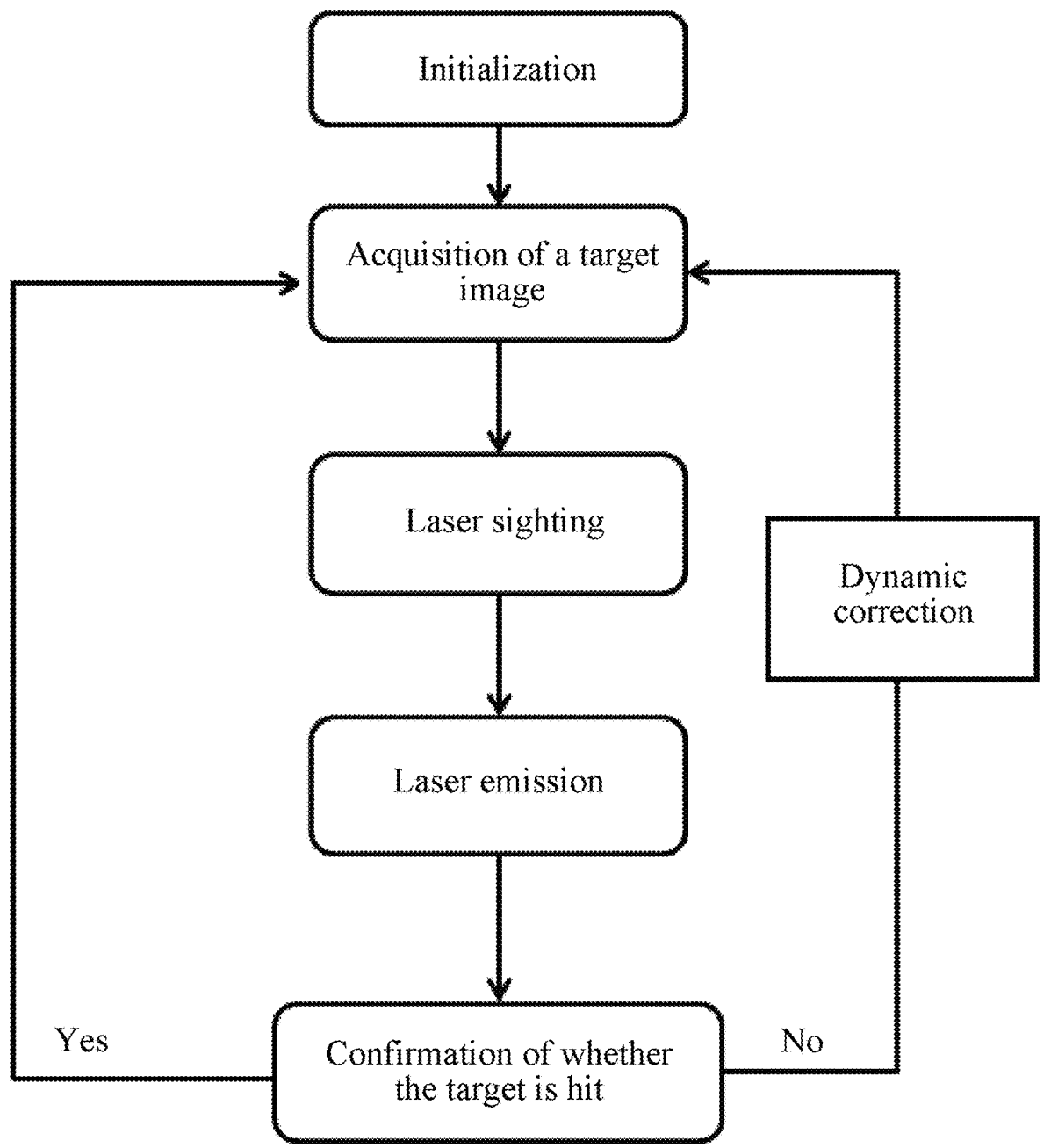
FIG. 2 is a flowchart of a method according to the present invention.

As shown in FIG. 2, an image processing-based laser emission and dynamic calibration method, applied to the image processing-based laser emission and dynamic calibration apparatus according to any one of the foregoing aspects, including the following steps:

S1: initialization: setting an initial angle of laser emission and a photographing angle of a fixed camera to be vertically downward, i.e., perpendicular to a target plane, and configuring a laser emission system to obtain an image through an image acquisition system synchronously each time laser is emitted, the image including a light spot of the laser;

S2: acquisition of a target image: controlling an angle of image acquisition in the image acquisition system to be perpendicular to the target plane, and acquiring, by the image acquisition system and the laser emission system, an original image in the process of movement, and transmitting same to an image processing system in real time;

S3: laser sighting: extracting, by the image processing system, pixel coordinates of a target in the original image and sending same to a control system, and calculating, by the control system, pixel coordinates of a vertical projection point of a laser emitter on the image, a transverse scanning distance coefficient and a longitudinal scanning distance coefficient;

S4: laser emission: calculating, by the control system, a transverse scanning angle and a longitudinal scanning angle of laser emission based on the transverse scanning distance coefficient, the longitudinal scanning distance coefficient and the pixel coordinates of the target, and controlling, by the control system, the laser emission system to adjust the transverse scanning angle and the longitudinal scanning angle of laser emission to emit laser;

S5: confirmation of whether the target is hit: acquiring, by the image acquisition system, an image of laser emission and sending same to the image processing system to determine whether pixel coordinates of the laser spot in the image are consistent with the pixel coordinates of the target; if yes, confirming that the target is hit and returning to the step S2 to acquire a new target image; and if not, proceeding to the step S6; and S6: if the target is not hit, dynamically correcting a laser emission parameter based on a current laser emission angle and the image of the laser spot acquired by the image acquisition system; using a new transverse scanning distance coefficient, a new longitudinal scanning distance coefficient, projection coordinates of the laser emitter, and a corrected initial emission angle after the correction; and returning to the step S2 to reacquire a target image.

A specific process of calculating pixel coordinates of a vertical projection point of a laser emitter on the image, a transverse scanning distance coefficient and a longitudinal scanning distance coefficient in the step S3 includes:

S31: establishing a coordinate system: the pixel coordinates of the vertical projection points of the laser emitter and the image acquisition system on the image being $(x_s, y_s)$ and $(x_0, y_0)$ respectively, where $(x_0, y_0)$ is always an image center; and reestablishing a rectangular coordinate system on the image;

S32: controlling, by the control system, the laser emitter to emit laser at any two angles $a_1$ and $a_2$, and dividing the two angles $a_1$ and $a_2$ into a transverse scanning angle and a longitudinal scanning angle according to the rectangular coordinate system in the step S31, i.e., $(a_{L1}, a_{v1})$ and $(a_{L2}, a_{v2})$; and S33: obtaining pixel coordinates $(x_{L1}, y_{v1})$ and $(x_{L2}, y_{v2})$ of the laser spot after the laser is emitted by the laser emitter at any two angles $a_1$ and $a_2$, and calculating the pixel coordinates of the vertical projection point of the laser emitter on the image, the transverse scanning distance coefficient and the longitudinal scanning distance coefficient according to a trigonometric function. It should be noted that the angles $(a_{L1}, a_{v1})$ and $(a_{L2}, a_{v2})$ divided according to the vertical coordinate system and the coordinates $(x_{L1}, y_{v1})$ and $(x_{L2}, y_{v2})$ are positive and negative, and signs of the angles and the coordinates are the same, and are related to the pixel coordinates $(x_s, y_s)$ of the vertical projection point of the laser emitter on the image, that is, the direction of the angle is consistent with the direction of the coordinates relative to $(x_s, y_s)$.

Taking the rectangular coordinate system in which the pixel coordinates $(x_s, y_s)$ of the vertical projection point of the laser emitter on the image are the coordinate origin as an example, when the coordinates $(x_{L1}, y_{v1})$ are both negative values, the coordinates $(x_{L1}, y_{v1})$ are located in a third quadrant of the coordinate system, and the angle $a_1$ of emission of the laser emitter is an included angle with the vertical direction, and the divided angles $(a_{L1}, a_{v1})$ respectively refer to rotations in the negative direction of the x-axis and the negative direction of the y-axis, and thus the divided angles $(a_{L1}, a_{v1})$ are both negative values.

The present invention completes automatic adjustment of the laser emission angle by dividing the to-be-adjusted angle of laser emission into two angles in the transverse and longitudinal directions, thereby realizing automatic sighting and emission of laser.

Figure 3:
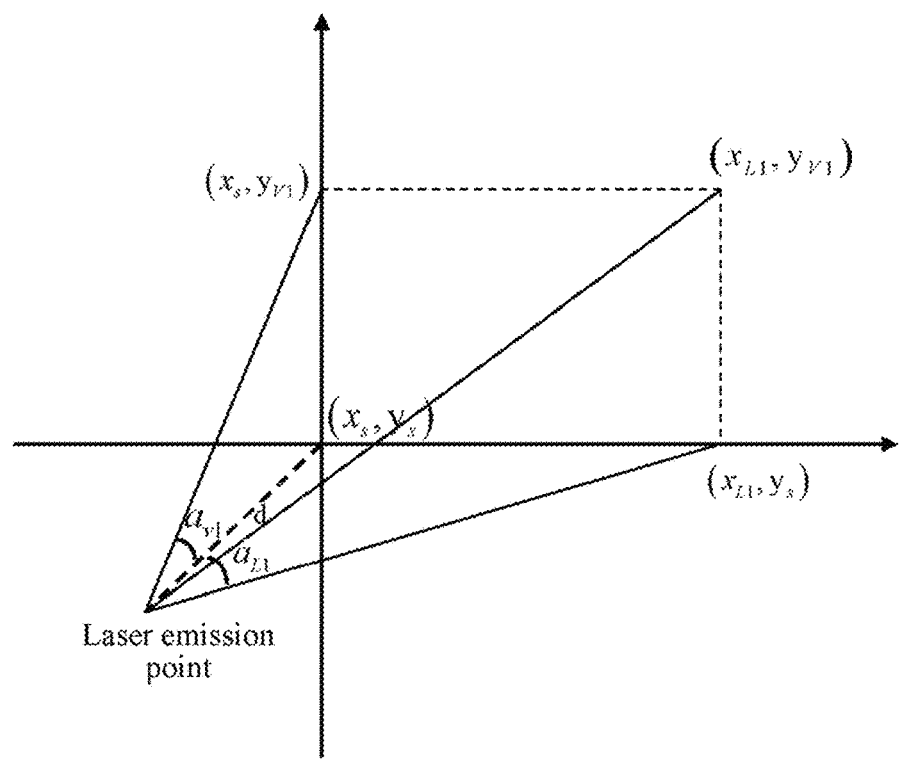
FIG. 3 is a schematic diagram of an angle of a first calibration point of laser emission calibration according to the present invention.

As shown in FIG. 3, formulas for calculating the pixel coordinates of the vertical projection point of the laser emitter on the image, the transverse scanning distance coefficient and the longitudinal scanning distance coefficient according to the trigonometric function are as follows:

$$d*cL = \frac{(x_{L1} - x_s)}{\tan(a_{L1})} \quad (1)$$

$$d*cL = \frac{(x_{L2} - x_s)}{\tan(a_{L2})} \quad (2)$$

$$d*cV = \frac{(y_{V1} - y_s)}{\tan(a_{V1})} \quad (3)$$

$$d*cV = \frac{(y_{V2} - y_s)}{\tan(a_{V2})} \quad (4)$$

where cL is the transverse scanning distance coefficient in unit of (pixel/m); cV is the longitudinal scanning distance coefficient in unit of (pixel/m); d is the vertical distance between the laser emission system and the target plane in unit of m; and $(x_s, y_s)$ is the pixel coordinates of the laser spot when the laser emission system emits laser vertically downward.

Figure 4:
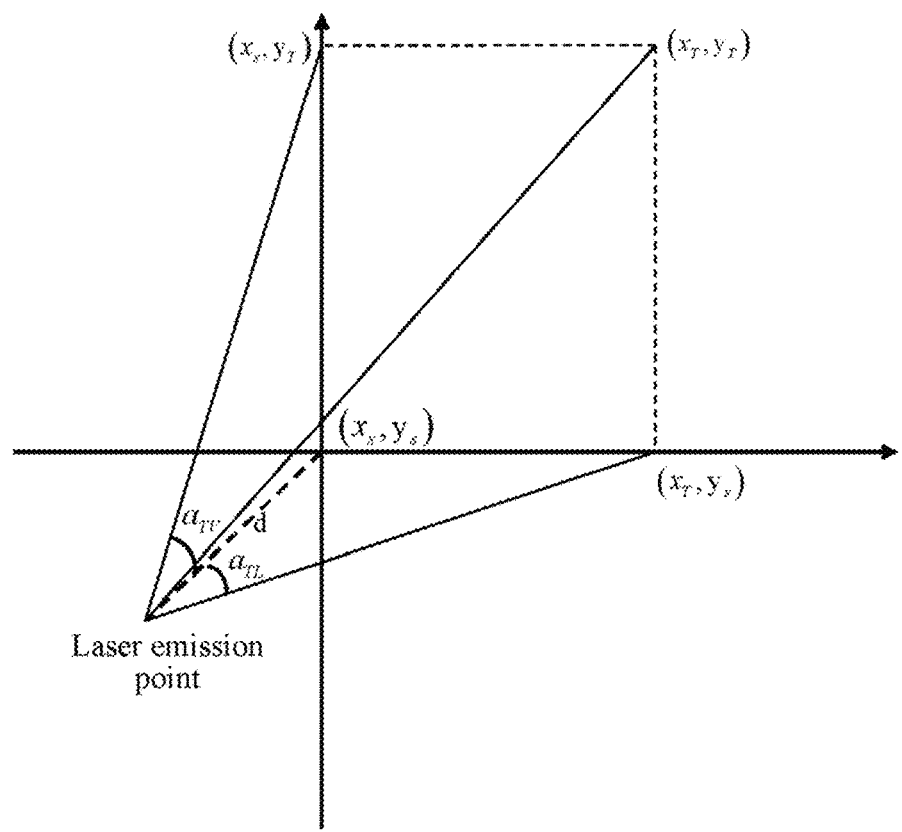
FIG. 4 is a schematic diagram of control of a laser emission angle according to the present invention.

As shown in FIG. 4, calculation formulas for calculating the transverse scanning angle and the longitudinal scanning angle of laser emission in the step S4 are as follows:

$$\tan(a_{TL}) = \frac{(x_T - x_s)}{d*cL} \quad (5)$$

$$\tan(a_{TV}) = \frac{(y_T - y_s)}{d*cV} \quad (6)$$

where $a_{TL}$ is the transverse scanning angle of laser emission, $a_{TV}$ is the longitudinal scanning angle of laser emission, cL is the transverse scanning distance coefficient, cV is the longitudinal scanning distance coefficient, d is the vertical distance between the laser emission system and the target plane, $(x_T, y_T)$ is the pixel coordinates of the target, and $(x_s, y_s)$ is the pixel coordinates of the vertical projection point of the laser emitter on the image.

It can be seen from Formulas (1) to (6) that in calculation of the transverse scanning distance coefficient and the longitudinal scanning distance coefficient in the present invention, there is no need to calculate specific values of cL and cV, or to obtain an actual three-dimensional distance value of the vertical distance d between the laser emission system and the target plane. d*cL and d*cV in Formulas (1) to (4) may be taken as a whole and substituted into Formulas (5) and (6) for calculation, that is, no additional distance measuring device is needed, which greatly reduces production cost.

In the step S6, calculation of the transverse scanning distance coefficient and the longitudinal scanning distance coefficient further includes dynamic correction including: controlling, by the control system, the laser emitter to adjust the angle multiple times and emit laser; and after obtaining the pixel coordinates of the laser spot on the image respectively, recalculating and updating the transverse scanning distance coefficient and the longitudinal scanning distance coefficient according to the trigonometric function.

In some embodiments, when the vertical distance d between the laser emission system and the target plane changes, or the emission angle is relatively large, or the target plane is not strictly perpendicular to the photographing center line of the camera, or the vertical emission angle of the laser deviates, an emission error may be generated. If the laser emission deviates from the target, the photographing angle is calibrated and corrected multiple times using the trigonometric function based on data collected from the previous emissions and image acquisition. d*cL, d*cV, $(x_s, y_s)$ and the corrected initial emission angle are dynamically updated. Taking transverse scanning of the data of the previous four emissions as an example, assuming that the first emission angle in the transverse scanning direction is a0, and the spot coordinate is x0. The emission angles $\Delta ac1$, $\Delta ac2$, and $\Delta ac3$ are sequentially adjusted in the laser transverse scanning direction for the second, third and fourth emissions. The spot coordinates are x1, x2 and x3 respectively. In this case, the following formulas may be obtained according to the trigonometric function:

$$d*cL = \frac{(x1 - x_s)}{\tan(a0 + \Delta ac1) - \tan(a0)} \quad (7)$$

$$d*cL = \frac{(x2 - x_s)}{\tan(a0 + \Delta ac1 + \Delta ac2) - \tan(a0)} \quad (8)$$

$$d*cL = \frac{(x3 - x_s)}{\tan(a0 + \Delta ac1 + \Delta ac2 + \Delta ac3) - \tan(a0)} \quad (9)$$

According to Formulas (7), (8) and (9), new d*cL is solved, the first emission angle is a0 and $x_s$, and the fourth emission angle (a0+$\Delta ac1$+$\Delta ac2$+$\Delta ac3$) may be used as a basic angle, i.e., the corrected initial emission angle, for new angle adjustment control.

Taking the transverse scanning direction as an example, assuming that the target is at $x_T$, in order to hit the target, the angle needs to be adjusted to $\Delta acT$, and the following formula may be obtained:

$$\tan(a0 + \Delta ac1 + \Delta ac2 + \Delta ac3 + \Delta acT) - \quad (10)$$
$$\tan(a0 + \Delta ac1 + \Delta ac2 + \Delta ac3) = \frac{x_T - x_s}{d*cL}$$

d*cL, $x_s$, and (a0+$\Delta ac1$+$\Delta ac2$+$\Delta ac3$) are substituted thereinto to solve an angle $\Delta acT$ that needs to be adjusted for emitting laser. The laser may be emitted by adjusting the angle from the corrected initial emission angle a0+$\Delta ac1$+$\Delta ac2$+$\Delta ac3$ to a0+$\Delta ac1$+$\Delta ac2$+$\Delta ac3$+$\Delta acT$. It is also possible to optimize the emission parameters using a method such as the least square method according to the previous multiple emission angles and the acquired corresponding spot coordinate information.

The present invention may be loaded on unmanned aerial vehicles and other systems to expand the space range of its application, so as to achieve various operational purposes. Taking an unmanned aerial vehicle as an example, the system can realize aerial operations using the flight capability of the unmanned aerial vehicle. For example, the unmanned aerial vehicle is utilized to cruise through farmland, information about certain pests or weeds is acquired and processed through the image acquisition system, and laser is emitted for insecticidal weeding, so as to reduce or stop pesticide application and realize the purpose of organic agriculture.

An electronic device, including a memory, a processor, and a computer program stored in the memory and executable by the processor, where the image processing-based laser emission and dynamic calibration method according to any one of the above aspects is implemented when the processor executes the program. The memory may be various types of memories, such as a Random Access Memory (RAM), a Read-Only Memory (ROM), and a flash memory. The processor may be various types of processors, such as a central processing unit, a microprocessor, a digital signal processor, or an image processor.

A computer readable storage medium, having computer executable instructions stored thereon, where the computer executable instructions are configured to execute the image processing-based laser emission and dynamic calibration method according to any one of the above aspects. The storage medium includes various media that may store processing code, such as a USB flash drive, a removable hard disk, a ROM, a RAM, a magnetic disk, and an optical disc.

The above descriptions are only preferred embodiments of the present invention. It should be noted that a person of ordinary skill in the art may make various improvements and modifications without departing from the principles of the present invention, and such improvements and modifications shall all fall within the protection scope of the present invention.

What is claimed is:

1. An image processing-based laser emission and dynamic calibration method, comprising the following steps:
    S1: initialization: setting an initial angle of laser emission and a photographing angle of a fixed camera to be vertically downward, i.e., perpendicular to a target plane, and configuring a laser emission system to obtain an image through an image acquisition system synchronously each time laser is emitted, the image comprising a light spot of the laser;
    S2: acquisition of a target image: controlling an angle of image acquisition in the image acquisition system to be perpendicular to the target plane, and acquiring, by the image acquisition system and the laser emission system, an original image in the process of movement, and transmitting same to an image processing system in real time;
    S3: laser sighting: extracting, by the image processing system, pixel coordinates of a target in the original image and sending same to a control system, and calculating, by the control system, pixel coordinates of a vertical projection point of a laser emitter on the image, a transverse scanning distance coefficient and a longitudinal scanning distance coefficient;
    S4: laser emission: calculating, by the control system, a transverse scanning angle and a longitudinal scanning angle of the laser emission based on the transverse scanning distance coefficient, the longitudinal scanning distance coefficient and the pixel coordinates of the target, and controlling, by the control system, the laser emission system to adjust the transverse scanning angle and the longitudinal scanning angle of the laser emission to emit laser;
    S5: confirmation of whether the target is hit: acquiring, by the image acquisition system, an image of the laser emission and sending same to the image processing system to determine whether pixel coordinates of the laser spot in the image are consistent with the pixel coordinates of the target; when yes, confirming that the target is hit and returning to the step S2 to acquire a new target image; and when not, proceeding to the step S6; and
    S6: when the target is not hit, dynamically correcting a laser emission parameter based on a current laser emission angle and the image of the laser spot acquired by the image acquisition system; using a new transverse scanning distance coefficient, a new longitudinal scanning distance coefficient, projection coordinates of the laser emitter, and a corrected initial emission angle after the correction; and returning to the step S2 to reacquire a target image.

2. The image processing-based laser emission and dynamic calibration method according to claim 1, wherein a specific process of calculating the pixel coordinates of the vertical projection point of the laser emitter on the image, the transverse scanning distance coefficient and the longitudinal scanning distance coefficient in the step S3 comprises:

S31: establishing a coordinate system: the pixel coordinates of the vertical projection points of the laser emitter and the image acquisition system on the image being $(x_s, y_s)$ and $(x_0, y_0)$ respectively, wherein $(x_0, y_0)$ is always an image center; and reestablishing a rectangular coordinate system on the image;

S32: controlling, by the control system, the laser emitter to emit laser at any two angles $a_1$ and $a_2$, and dividing the two angles $a_1$ and $a_2$ into a transverse scanning angle and a longitudinal scanning angle according to the rectangular coordinate system in the step S31, i.e., $(a_{L1}, a_{v1})$ and $(a_{L2}, a_{v2})$; and S33: obtaining pixel coordinates $(x_{L1}, y_{v1})$ and $(x_{L2}, y_{v2})$ of the laser spot after the laser is emitted by the laser emitter at any two angles $a_1$ and $a_2$, and calculating the pixel coordinates of the vertical projection point of the laser emitter on the image, the transverse scanning distance coefficient and the longitudinal scanning distance coefficient according to a trigonometric function.

3. The image processing-based laser emission and dynamic calibration method according to claim 2, wherein formulas for calculating the pixel coordinates of the vertical projection point of the laser emitter on the image, the transverse scanning distance coefficient and the longitudinal scanning distance coefficient according to the trigonometric function are:

$$d * cL = \frac{(x_{L1} - x_s)}{\tan(a_{L1})}$$

$$d * cL = \frac{(x_{L2} - x_s)}{\tan(a_{L2})}$$

$$d * cV = \frac{(y_{V1} - y_s)}{\tan(a_{V1})}$$

$$d * cV = \frac{(y_{V2} - y_s)}{\tan(a_{V2})}$$

wherein cL is the transverse scanning distance coefficient, cV is the longitudinal scanning distance coefficient, and d is a vertical distance between the laser emitter and the target plane.

4. An image processing-based laser emission and dynamic calibration apparatus, for implementing the image processing-based laser emission and dynamic calibration method according to claim 3, comprising an image acquisition system, an image processing system, a laser emission system and a control system;

the image acquisition system being configured to acquire images of a target and a laser spot;

the image processing system being connected to the image acquisition system, and being configured to extract the target's attribute and coordinate information, as well as coordinate information and size information of the laser spot;

the control system being connected to the image processing system, and being configured to sight or calibrate a laser emission angle according to a result of the image processing system, and send an instruction to the laser emission system; and the laser emission system being bound to the image acquisition system with a relative distance unchanged, being connected to the control system, and being configured to calibrate the laser emission angle based on the instruction of the control system or emit laser.

5. The image processing-based laser emission and dynamic calibration apparatus according to claim 4, wherein the laser emission system comprises a laser emitter and a laser steering apparatus; the laser emitter is installed on the laser steering apparatus; the laser steering apparatus is connected to the control system, and is configured to calibrate the laser emission angle based on the instruction of the control system; calibration of the laser emission angle comprises angle calibrations in the transverse and longitudinal directions; and the laser emitter is connected to the control system, and is configured to emit laser after receiving the instruction of the control system.

6. The image processing-based laser emission and dynamic calibration apparatus according to claim 5, wherein the laser steering apparatus comprises two motors, and the two motors respectively control the angle of laser emission from the transverse and longitudinal directions.

7. The image processing-based laser emission and dynamic calibration method according to claim 2, wherein the dynamically correcting, and calculating the updated transverse scanning distance coefficient, the updated longitudinal scanning distance coefficient, the projection coordinates of the laser emitter, and the corrected initial emission angle in the step S6 comprises: controlling, by the control system, the laser emitter to adjust the angle multiple times and emit laser; and after obtaining the pixel coordinates of the laser spot on the image respectively, recalculating and updating the transverse scanning distance coefficient, the longitudinal scanning distance coefficient, the projection coordinates of the laser emitter and the corrected initial emission angle according to the trigonometric function.

8. An image processing-based laser emission and dynamic calibration apparatus, for implementing the image processing-based laser emission and dynamic calibration method according to claim 7, comprising an image acquisition system, an image processing system, a laser emission system and a control system;

the image acquisition system being configured to acquire images of a target and a laser spot;

the image processing system being connected to the image acquisition system, and being configured to extract the target's attribute and coordinate information, as well as coordinate information and size information of the laser spot;

the control system being connected to the image processing system, and being configured to sight or calibrate a laser emission angle according to a result of the image processing system, and send an instruction to the laser emission system; and the laser emission system being bound to the image acquisition system with a relative distance unchanged, being connected to the control system, and being configured to calibrate the laser emission angle based on the instruction of the control system or emit laser.

9. The image processing-based laser emission and dynamic calibration apparatus according to claim 8, wherein the laser emission system comprises a laser emitter and a laser steering apparatus; the laser emitter is installed on the laser steering apparatus; the laser steering apparatus is connected to the control system, and is configured to calibrate the laser emission angle based on the instruction of the control system; calibration of the laser emission angle comprises angle calibrations in the transverse and longitudinal directions; and the laser emitter is connected to the control system, and is configured to emit laser after receiving the instruction of the control system.

10. The image processing-based laser emission and dynamic calibration apparatus according to claim 9, wherein the laser steering apparatus comprises two motors, and the two motors respectively control the angle of laser emission from the transverse and longitudinal directions.

11. The image processing-based laser emission and dynamic calibration method according to claim 2, wherein calculation formulas for calculating the transverse scanning angle and the longitudinal scanning angle of the laser emission in the step S4 are:

$$\tan(a_{TL}) = \frac{(x_T - x_s)}{d * cL}$$

$$\tan(a_{TV}) = \frac{(y_T - y_s)}{d * cV}$$

wherein an is the transverse scanning angle of the laser emission, $a_{TV}$ is the longitudinal scanning angle of the laser emission, cL is the transverse scanning distance coefficient, cV is the longitudinal scanning distance coefficient, d is the vertical distance between the laser emission system and the target plane, $(x_T, y_T)$ is the pixel coordinates of the target, and $(x_s, y_s)$ is the pixel coordinates of the vertical projection point of the laser emitter on the image.

12. An image processing-based laser emission and dynamic calibration apparatus, for implementing the image processing-based laser emission and dynamic calibration method according to claim 11, comprising an image acquisition system, an image processing system, a laser emission system and a control system;
the image acquisition system being configured to acquire images of a target and a laser spot;
the image processing system being connected to the image acquisition system, and being configured to extract the target's attribute and coordinate information, as well as coordinate information and size information of the laser spot;
the control system being connected to the image processing system, and being configured to sight or calibrate a laser emission angle according to a result of the image processing system, and send an instruction to the laser emission system; and
the laser emission system being bound to the image acquisition system with a relative distance unchanged, being connected to the control system, and being configured to calibrate the laser emission angle based on the instruction of the control system or emit laser.

13. An image processing-based laser emission and dynamic calibration apparatus, for implementing the image processing-based laser emission and dynamic calibration method according to claim 2, comprising an image acquisition system, an image processing system, a laser emission system and a control system;
the image acquisition system being configured to acquire images of a target and a laser spot;
the image processing system being connected to the image acquisition system, and being configured to extract the target's attribute and coordinate information, as well as coordinate information and size information of the laser spot;
the control system being connected to the image processing system, and being configured to sight or calibrate a laser emission angle according to a result of the image processing system, and send an instruction to the laser emission system; and
the laser emission system being bound to the image acquisition system with a relative distance unchanged, being connected to the control system, and being configured to calibrate the laser emission angle based on the instruction of the control system or emit laser.

14. The image processing-based laser emission and dynamic calibration apparatus according to claim 13, wherein the laser emission system comprises a laser emitter and a laser steering apparatus; the laser emitter is installed on the laser steering apparatus; the laser steering apparatus is connected to the control system, and is configured to calibrate the laser emission angle based on the instruction of the control system; calibration of the laser emission angle comprises angle calibrations in the transverse and longitudinal directions; and the laser emitter is connected to the control system, and is configured to emit laser after receiving the instruction of the control system.

15. The image processing-based laser emission and dynamic calibration apparatus according to claim 14, wherein the laser steering apparatus comprises two motors, and the two motors respectively control the angle of laser emission from the transverse and longitudinal directions.

16. An image processing-based laser emission and dynamic calibration apparatus, for implementing the image processing-based laser emission and dynamic calibration method according to claim 1, comprising an image acquisition system, an image processing system, a laser emission system and a control system;
the image acquisition system being configured to acquire images of a target and a laser spot;
the image processing system being connected to the image acquisition system, and being configured to extract the target's attribute and coordinate information, as well as coordinate information and size information of the laser spot;
the control system being connected to the image processing system, and being configured to sight or calibrate a laser emission angle according to a result of the image processing system, and send an instruction to the laser emission system; and
the laser emission system being bound to the image acquisition system with a relative distance unchanged, being connected to the control system, and being configured to calibrate the laser emission angle based on the instruction of the control system or emit laser.

17. The image processing-based laser emission and dynamic calibration apparatus according to claim 16, wherein the laser emission system comprises a laser emitter and a laser steering apparatus; the laser emitter is installed on the laser steering apparatus; the laser steering apparatus is connected to the control system, and is configured to calibrate the laser emission angle based on the instruction of the control system; calibration of the laser emission angle comprises angle calibrations in the transverse and longitudinal directions; and the laser emitter is connected to the control system, and is configured to emit laser after receiving the instruction of the control system.

18. The image processing-based laser emission and dynamic calibration apparatus according to claim 17, wherein the laser steering apparatus comprises two motors, and the two motors respectively control the angle of laser emission from the transverse and longitudinal directions.

19. An electronic device, comprising a memory, a processor, and a computer program stored in the memory and executable by the processor, wherein the image processing-based laser emission and dynamic calibration method according to claim 1 is implemented when the processor executes the program.

20. A non-transitory computer readable storage medium, having computer executable instructions stored thereon, wherein the computer executable instructions are configured to execute the image processing-based laser emission and dynamic calibration method according to claim 1.

* * * * *